Oct. 12, 1971 W. R. GARRETT 3,611,541
TOOL JOINT REBUILDING
Filed Jan. 1, 1970 3 Sheets-Sheet 1

1945 - RED ELDER,
RECORD DRILLING CO.
SANTA MARIA, CALIF.

1953
MORLEY MACHINE
U.S. ARMY

William R. Garrett
INVENTOR.

BY
Murray Robinson
ATTORNEY

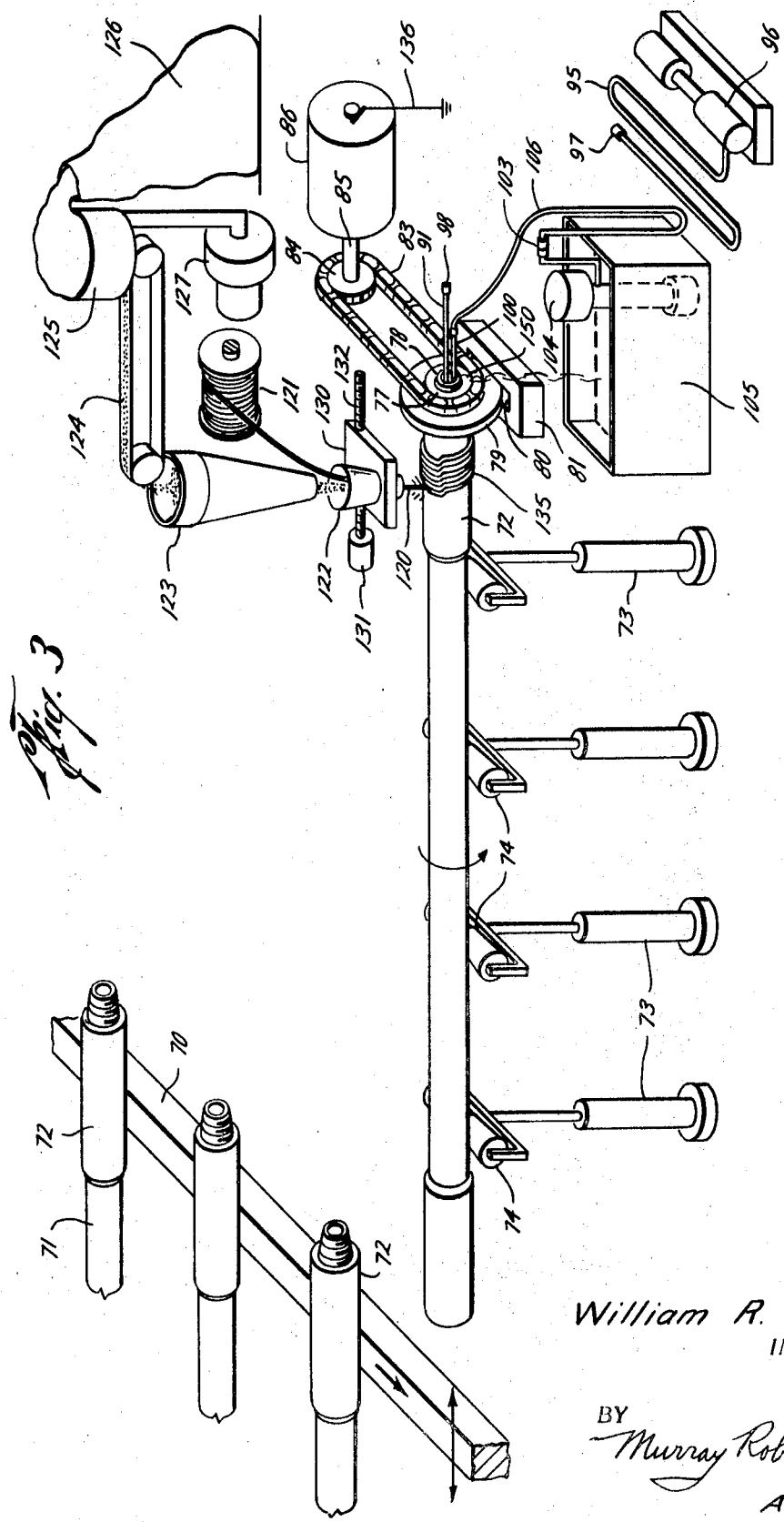

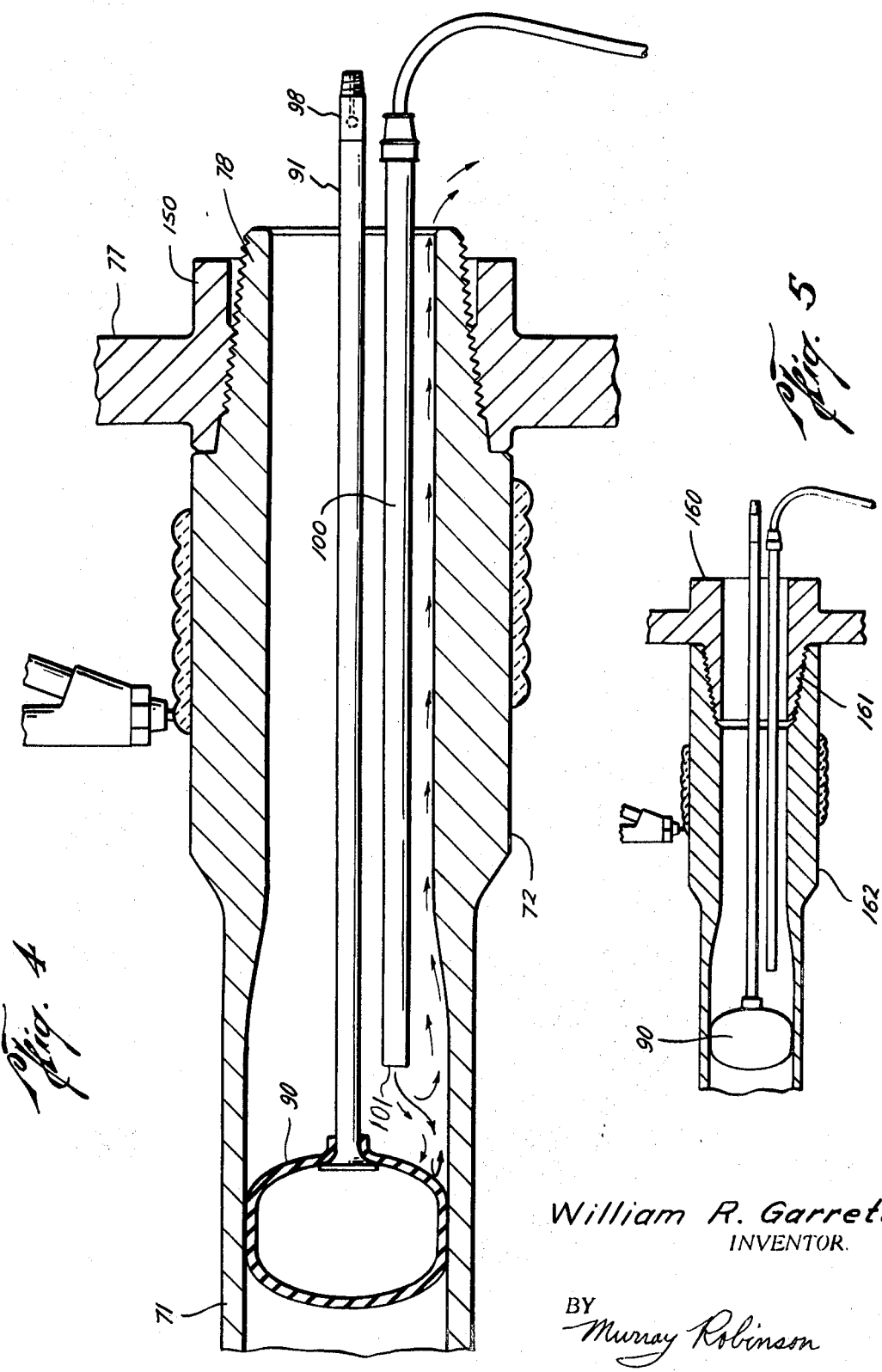

United States Patent Office 3,611,541
Patented Oct. 12, 1971

3,611,541
TOOL JOINT REBUILDING
William R. Garrett, Midland, Tex., assignor to Smith International, Inc., Drilco Division, Midland, Tex.
Filed Jan. 30, 1970, Ser. No. 7,016
Int. Cl. B22d 19/10; B23p 7/00
U.S. Cl. 29—401  5 Claims

ABSTRACT OF THE DISCLOSURE

The outer periphery of a worn down tool joint on the end of a drill pipe is restored to desired diameter by applying a weld bead to the outer periphery of the tool joint, the joint being rotated and the weld rod periodically, i.e. once each revolution, translated, the width of one weld bead, parallel to the joint axis, during application of the weld metal. Cooling of the joint during welding is effected by plugging the pipe interior adjacent the tool joint and admitting water to the pipe adjacent the plug, the water flowing back through the tool joint and out the end of the pipe. An open air tank receives the hot water from the pipe. The water cools in the tank and is recirculated by a pump back into the pipe adjacent the plug. The plug is an expandable bladder carried on the end of a compressed air pipe by means of which the bladder is inserted through the internal upset of the pipe and expanded.

BACKGROUND OF THE INVENTION

This invention pertains to method and apparatus for rebuilding drill pipe tool joints and more particularly to the cooling of the joint during application of weld metal to the joint.

(b) Discussion of the prior art

As early as 1945, in Santa Monica, Calif., Red Elder of the Stoody Company, Whittier, Calif., rebuilt drill pipe tool joints for the Record Drilling Company by applying a helical bead of weld metal to the outer periphery of the tool joint while manually rotating the joint and translating the weld rod parallel to the joint axis. The joint was cooled by connecting a water line to a plug being rebuilt and flowing the water through the pipe and out its other end. A hand wheel connected to the plug facilitated rotation of the pipe, which was supported along its length in cradles.

Buildup of a rotation band on three to six inch artillery shells is a use of a welding machine developed for the U.S. Army, Ordinance Corps, and used at Frankford Arsenal, Philadelphia, Pa., The machine is described in Instruction Sheet XX entitled Morley Model "F" and "FA" Universal Rotating Bank Welding Machine for Projectiles—Operating Instruction published by The Morley Machine Corporation of 3110 Winston Road. S. Rochester, N.Y., Feb. 11, 1953, as revised Feb. 10, 1954. In this machine the weld electrode is fed automatically to the outer periphery of the shell while the shell rotates and there is relative axial translation of the shell and weld electrode to apply a helical weld bead to the shell. Cooling of the weld is effected by water or a water-oil emulsion sprayed onto the inside of the shell opposite the arc from a radial nozzle on the end of a water pipe. The water pipe extends through the head stock spindle into the open, fuse end of the shell. After striking the shell interior the water flows out of the shell into the annulus between the spindle and water pipe and out the end of the spindle remote from the shell. There are holes in the spacers that center the water pipe in the spindle, the holes forming flow passages for the return water. In the case of the oil-water coolant, economy is effected by catching the return coolant in a reservoir and pumping it back to the water inlet, a heat exchanger being provided in the circuit to cool the return oil-water emulsion before admitting it to the water pipe at the end of the head stock spindle. Any leakage of coolant between the shell and head stock is caught in a catch pan.

In U.S. Pat. No. 2,813,190 issued Nov. 12, 1957 on the application of Charles R. Felmley, Jr. there is disclosed a similar apparatus in which a helical bead of weld metal is applied to the exterior of an artillery shell nearer one end thereof by rotating the shell and translating the weld rods lengthwise of the shell while cooling the shell by flowing water into and out of the shell through pipes entering the shell at its end opposite from that being welded.

A similar welding and cooling procedure has been used for the attachment of a helical fin to tubing, as described in British Pat. No. 843,200, published Aug. 4, 1960, on the application of Ross et al. Limited. In this procedure the cooling water is admitted from a pipe line to a hollow center carried by the tail stock of a lathe, the hollow centre supporting one end of the tubing to be welded, the tubing rotating on the centre. A flow pipe connected to the center carries cooling water to the opposite end of the tubing, which is gripped by the lathe chuck to be rotated thereby. Cooling water is thus carried to the chuck end of the tubing through the flow pipe from whence it returns to the hollow center through the annulus between the flow pipe and tubing.

U.S. Pat. No. 3,139,510 was issued June 30, 1964 on the application of Price E. Marion. This patent also discloses build up of weld metal on the exterior of a pipe while water is flowed through the pipe. However the water is stated to be for the purpose of transferring heat along the pipe to eliminate temperature gradient and maintain a constant relatively high temperature along the drill pipe. Water is admitted to one end of the pipe through a chuck and emerges from the other end of the pipe through another chuck, both chucks being screwed to the pipe, Both ends of the pipe are simultaneously built up with weld metal.

A publication by Drilco Oil Tools, Inc. in 1967 entitled Drill Pipe Service Center discloses the build up of the outer periphery of a tool joint on the end of a drill pipe using fully automatic submerged arc welding equipment. The tool joint is supported along its length by rollers and is rotated by a motor driving a sub screwed to the tool joint end of the pipe. The pipe is cooled by flowing water into the pipe through the sub, the water emerging from the end opposite to that being built up and falling into a trough. The water can be pumped from the trough back into the tool joint end of the pipe if it is desired to conserve water.

It will be apparent from the foregoing discussion of the prior art that two general methods are represented:

(1) In the Ross et al. and Marion methods, welding is performed at both ends or throughout the length of a tubular member and water flows through the whole length of the pipe in heat transfer relationship, relative thereto.

(2) In the Elder, Morley, Felmley, and Drilco methods, welding is performed at one location on the tubular member and cooling is required only at that one location. The remainder of the tubular member can be used as a water conduit and outlet but the water performs no function of heat exchange with the welded work during such passage.

It is further to be observed that in all of the above discussed prior art, plumbing elements are provided at both ends of the tube being worked on. There is a water inlet at one end of the tube and at the other end there is either an outlet pipe or receiver or else a closure to cause the water to flow back to the inlet end of the tube after traversing the length of the tube being welded. The apparatus requiring attention is thus spread out over a considerable area, especially in the case where the tube being worked on is of great length, such as a drill pipe.

SUMMARY OF THE INVENTION

According to the invention, all plumbing elements and coolant flow are confined to the end of the length of drill pipe being built up. This is accomplished by inserting an inflatable plug through the end of the pipe being built up, the insertion being effected while the plug is deflated so that it can pass through internal constrictions such as an internal upset, the plug being inflated when positioned just past the tool joint portion of the pipe which is to be built up. A check valve in the air inlet pipe connected to the plug maintains the air pressure after the air hose from the source of compressed air is removed. Therefore no rotary, air tight connection to the plug is required. A water line is inserted through the end of the pipe to a position where the end of the water pipe is past the tool joint portion of the pipe, so that any water emerging from the water line will flow through the tool joint. No rotary, water tight connection is required for the water line, since all water leaking out from between the end of the water line and the end of the pipe contacts the tool joint and performs its function of cooling the joint. Since the water inlet, water outlet, and the inflatable plug seal are all located at the one end of the drill pipe which is being welded, it is easier for the operator to monitor the entire operation than would be the case if the apparatus was distributed to both ends of the pipe. In addition, when a piece of drill pipe is being positioned for welding, it is unnecessary to put the far end of the drill pipe in a chuck or make any other connection thereto, and no lathe like rotating device supporting the work at both ends is required, it being sufficient merely to cradle the pipe in rollers.

Other objects and advantages of the invention will become apparent from the following description of a preferred embodiment thereof, references being had to the accompanying drawings.

BRIEF DESCRIPTION OF THE DRAWINGS

FIG. 3 is a vertical section, partially schematic, illustrating the present invention;

FIG. 4 is a pictorial view illustrating the apparatus used in the method of the present invention, and FIG. 5 is a section similar to FIG. 3 illustrating a modification.

DESCRIPTION OF PREFERRED EMBODIMENT

Before describing the present invention, further reference will be made briefly to the prior art, in order better to point out the present invention.

Figure 1:
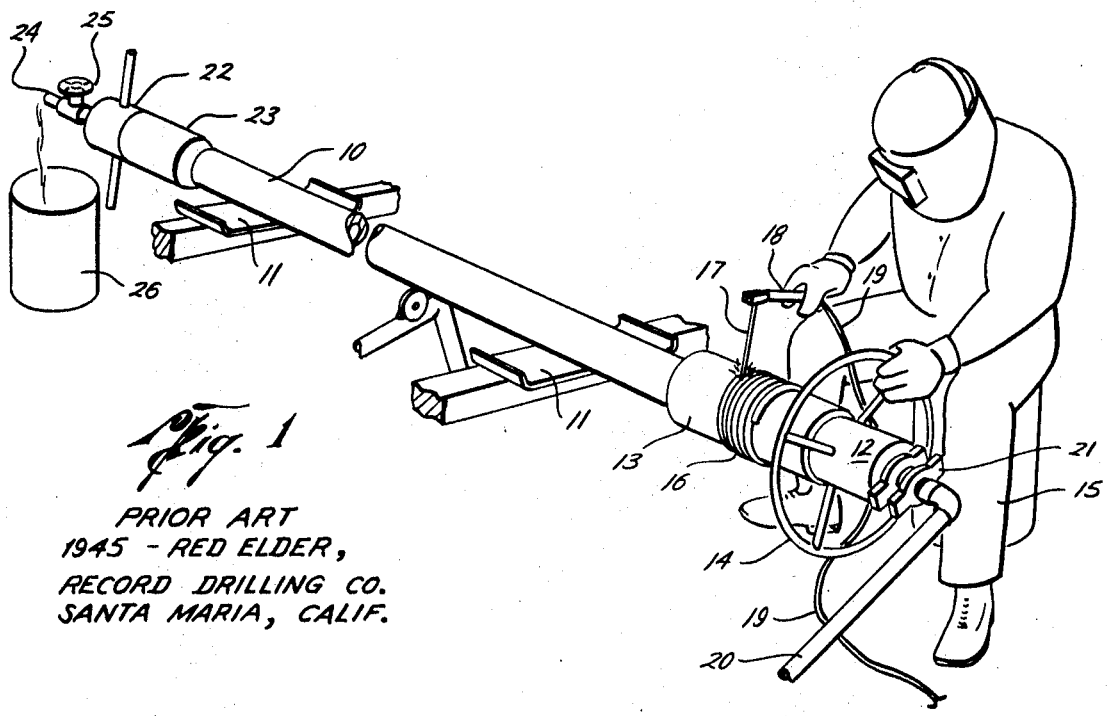
FIG. 1 is a pictorial view illustrating the prior art arrangement used in 1945 by Red Elder.

Referring first to the Red Elder, 1945 arrangement illustrated in FIG. 1, there is shown a length of drill pipe 10 supported on saddles 11. A sub 12 is screwed to the tool joint 13 at one end of the pipe. A hand wheel 14 secured to the plug enables operator 15 to rotate the pipe as a helical weld bead 16 is applied to the exterior of the tool joint with an electric arc weld rod 17. The rod is guided by the operator who holds onto a handle 18 by which the rod is carried and from which cable 19 extends to a welding machine (not shown). To cool the work, water is supplied from pipe 20 through rotatable packing gland 21 into sub 12. The water flows from the sub through the pipe 10 to the far end of the pipe and thence into a sub 22 screwed to the tool joint 23 at the far end of the pipe. The water emerges from sub 22 through small pipe 24. Pipe 24 is provided with a hand operated valve 25, whereby the amount of water in the pipe and the rate of water flow therethrough can be regulated. Water falls from an opening in pipe 24 into receptacle 26.

Figure 2:
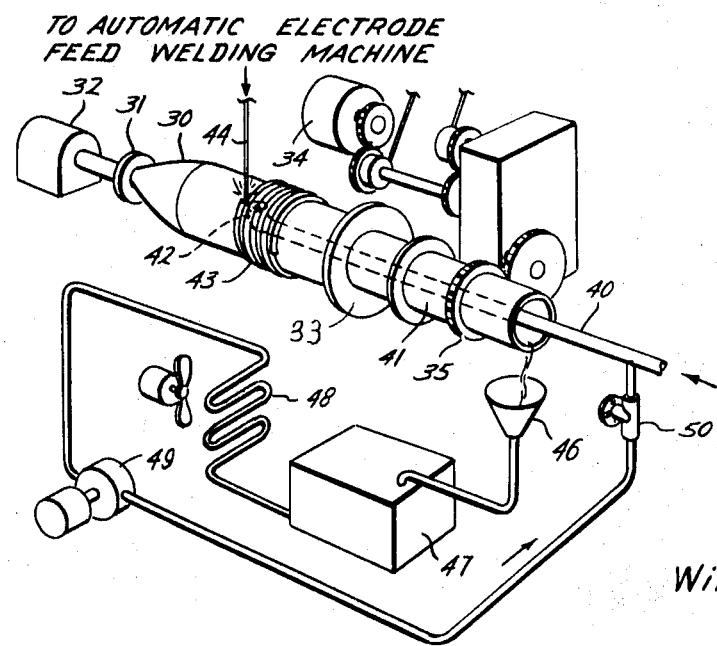
FIG. 2 is a schematic view illustrating the 1953 Morley machine used by the U.S. Army.

Referring next to FIG. 2, there is illustrated the arrangement of the 1953 Morley machine. A shell 30 is supported at one end by a tail stock 31 which rotates in bearing 32. The fuse end of the shell is supported by head stock 33 which is rotated by motor 34 through gears 35. Water conduit 40 extends through the head stock spindle 41 into the shell through the open end thereof and terminates in a radial nozzle 42. Coolant in the form of a water-oil liquid emulsion is discharged radially from the nozzle against the interior of the shell. A helical weld bead 43 is applied on the exterior of the shell by electrode 44, the electrode being fed automatically, by apparatus not shown, as the shell is rotated. The nozzle 42 discharges its coolant directly opposite the arc from the electrode to the shell. The coolant flows out of the shell via the annulus between the conduit 40 and the shell and the spindle and discharges into a funnel 46. The coolant flows from the funnel to a reservoir 47 and thence to a heat exchanger 48. Pump 49 conveys the coolant from the heat exchanger back to conduit 40 through hand operated valve 50.

Referring now to FIG. 3, there is shown an arrangement for building up the exterior of tool joints in accordance with the method and apparatus of the invention. At the left of the drawing is shown a conventional pipe storage rack 70 on which rest a plurality of lengths of drill pipe 71, disposed with their tool joint pin ends 72 nearest to the other equipment to be described. Extending transversely from the rack is a line of hydraulic jacks 73. At the upper end of each jack there is mounted a roller 74. When it is desired to rebuild the tool joint on a length of the drill pipe, the pipe is rolled to the part of the rack adjacent the rollers and then pushed axially onto the line of rollers 74 until it is positioned thereon as shown in the drawing.

With a length of drill pipe disposed on rollers 74, the jacks are elevated a few inches and a drive sprocket 77 is screwed onto the pin 78 at the end of the tool joint. The jacks are then lowered to allow flange 79, carried by the sprocket at one side thereof, to drop into guide slot 80 formed in the upper face of block 81. The block 81 is carried by suitable supports, not shown. A chain 83 is then connected about sprocket 77 and a sprocket 84 on the end of shaft 85 of electric motor 86.

Referring now also to FIG. 4, there is an expandable plug 90 carried on the end of pipe 91. The plug may be a bladder made of flexible or stretchable rubber or other elastomer or other suitable material. The end of pipe 91 is inserted into the drill pipe through pin 78 and tool joint 72. The plug is inserted while in a deflated condition so that it can pass through the internal upset, small diameter portion of the pipe where the tool joint is located.

An air hose 95, (FIG. 3), connected at one end to an air compressor 96, is then connected to pipe 91, and valve 97 is opened to expand the plug 90 into sealing engagement with the inside of the drill pipe. The air hose is then disconnected from pipe 91, a check valve 98 in the end of the pipe retaining the air in the plug to maintain it in an expanded state in sealing engagement with the drill pipe.

Water conduit 100 is not inserted into the drill pipe through pin 78 and tool joint 72. The conduit 100 is inserted far enough so that its end 101 is beyond the tool joint 72, e.g. close to plug 90. The conduit 100, like pipe 91, is preferably a tube made of rigid, rust proof material, such as stainless steel. At this time, or at any time thereafter when it is desired to cool the interior of the tool joint, the water valve 103 is opened and pump 104 operated to withdraw water from tank or receptacle 105 and move it through flexible hose 106 to conduit 100, from the end 101 of which the water discharges into the drill pipe. Being blocked by plug 90, the water cannot flow through the drill pipe but instead moves back outside conduit 100 and then falls out the end of the pin 78 into tank 105. The tank is large enough so that the water will cool somewhat before being pumped out again. If need be, a heat exchanger can be included in the pump outlet line. On the other hand, if conservation of water is not required, the hose 106 can be connected to a suitable water supply and the tank can discharge to a drain line.

Returning to the overall procedure, before the exterior of the tool joint is built up with weld metal, it is preheated at the surface, e.g. to about 350 degrees F., which can be done with a gas torch. During the preheating procedure, which takes about 15 minutes, the motor 86 can be operated to rotate the drill pipe slowly, e.g. about one revolution per minute. At this time the cooling water will be turned off. The water conduit 100 does not interfere with such rotation since it is not rigidly connected to the drill pipe, but merely lies loosely therein. However, if desired the water conduit need not be inserted until after the preheating is completed and the tool joint is ready to be welded.

An automatic welding machine may be used to apply the weld metal to the outside of the tool joint, as the tool joint is rotated, e.g. one and one-third revolutions per minute, by motor 86. As illustrated in FIG. 3, consumable electrode wire 120 is fed downwardly by unreeling of spool 121 on which it is wound. The wire passes through a funnel 122 into which is blown from hopper 123 a quantity of powdered weld flux. Hopper 122 is supplied with flux by belt conveyor 124 which receives flux from tank 125 into which it is drawn from sack 126 by vacuum machine 127. The flux funnel 122 and electrode wire are positioned relative to the tool joint by guide block 130. After each revolution of the tool joint an electric switch, not shown, operates motor 131 to turn lead screw 132 to move the electrode wire axially the width of one weld bead. In this manner the weld bead is applied uniformly to the tool joint in a series of circular beads 135. Other known welding apparatus can be used.

During the application of the weld metal electric current is supplied to the wire from a welding transformer, not shown, which vaporizes the end of the wire where an arc is formed extending to the outer surface of the preheated tool joint. The electricity may return to the transformer through a suitable ground wire, such as 136. The cooling water on the inside of the tool joint maintains a sufficiently high temperature gradient between the outside and inside of the tool joint to prevent the outside temperature of the tool joint from rising too high, whereby the metal of the vaporized electrode, upon contacting the tool joint, is rapidly cooled and condensed to a solid state before it has time to fall off.

After the welding operation is completed, the water is turned off at 103 and the water conduit 100 is removed from the drill pipe, this being a simple step since the conduit is connected to the pump by a flexible hose. Then the plug 90 is deflated by opening check valve 98 to allow the compressed air to escape from pipe 91. Just prior to deflating and removing the plug, the farthest hydraulic jack 73 may be elevated slightly to cause the remaining water to run out of pin 78 into receptacle 105. The nearest jack 73 is then elevated to withdraw flange 79 from guide slot 80, and the sprocket 77 is unscrewed from the end of the tool joint. Tongs may be applied to the hub 150 of sprocket 77 and to the drill pipe to facilitate breakout, a similar procedure also being suitable for the initial make up of these parts. The drill pipe, is then removed from the line of rollers 74 and sent to the machining and heat treating stations for completion of the work of rebuilding the tool joint, the outer surface of the joint being turned smooth at the machining station and the joint being stress relieved at the heat treat station.

Although the invention has been illustrated as applied to the rebuilding of a tool joint pin, it is easily adapted to the rebuilding of a tool joint box. By inserting a double pin sub into the box, the apparatus illustrated can be used without modification for applying a weld bead to the box exterior while cooling its interior. Alternatively, as shown in FIG. 5, a flanged drive sprocket 160 having an externally threaded pin 161 adapted to be screwed into tool joint box 162 can be used in place of sprocket 77 when it is desired to rebuild a tool joint box.

Other coolants than water can be used if desired, including gaseous as well as liquid coolants.

It will be apparent from the foregoing description that although the drill pipe is perhaps thirty feet long, all of the operations of rotating the pipe, applying weld material, and cooling the tool joint are carried on at one end of the pipe, which is of considerable advantage to the operator.

While a preferred embodiment of the invention has been shown and described, modifications thereof can be made by one skilled in the art without departing from the spirit of the invention.

What is claimed is:

1. Method of rebuilding the exterior of a tool joint at the end of a drill pipe comprising inserting an expandable plug into the end of the drill pipe past the tool joint, expanding the plug into sealing engagement with the inside of the drill pipe past the tool joint, inserting a coolant conduit into the drill pipe past the tool joint, and applying weld metal to the tool joint exterior while flowing coolant into the drill pipe via the coolant conduit and rotating the drill pipe about its axis whereby a peripheral weld bead is provided.

2. Method of claim 1 in which the plug is inserted into the drill pipe on the end of a tube.

3. Method of claim 2 in which the plug is expanded by connecting a source of fluid under pressure to the tube.

4. Method of claim 3 in which the drill pipe is rotated during application of weld metal thereto and the tube is disconnected from the source of fluid under pressure during such rotation and the tube is closed off to prevent the escape of fluid from the plug.

5. Method of claim 1 in which the plug is deflated to a diameter smaller than the minimum inside diameter of the tool joint prior to insertion into the drill pipe and is expanded to a larger diameter than the minimum inside diameter of the tool joint to seal with the inside of the drill pipe.

References Cited

UNITED STATES PATENTS

| 2,259,367 | 10/1941 | Ely et al. | 228—46 |
| 2,813,190 | 11/1957 | Felmley, Jr. | 219—74 X |
| 3,139,510 | 6/1964 | Marion | 219—76 |
| 3,292,254 | 12/1966 | Sloan | 29—494 |

JOHN F. CAMPBELL, Primary Examiner

R. B. LAZARUS, Assistant Examiner

U.S. Cl. X.R.

29—423; 117—94; 219—76; 228—46